United States Patent
Balakrishnan

(10) Patent No.: US 6,711,579 B2
(45) Date of Patent: Mar. 23, 2004

(54) DATA STORAGE SCHEMA INDEPENDENT PROGRAMMING FOR DATA RETRIEVAL USING SEMANTIC BRIDGE

(75) Inventor: Prabaharan Balakrishnan, Virudhunagar (IN)

(73) Assignee: Sree Ayyanar Spinning and Weaving Mills Limited, Tamil Nadu (IN)

( * ) Notice: Subject to any disclaimer, the term of this patent is extended or adjusted under 35 U.S.C. 154(b) by 349 days.

(21) Appl. No.: 09/839,814

(22) Filed: Apr. 20, 2001

(65) Prior Publication Data

US 2003/0110467 A1 Jun. 12, 2003

(51) Int. Cl.⁷ .............................................. G06F 17/30
(52) U.S. Cl. ....................................... 707/102; 717/174
(58) Field of Search ........................... 707/102; 717/174

(56) References Cited

U.S. PATENT DOCUMENTS

| | | | |
|---|---|---|---|
| 4,930,071 A | | 5/1990 | Tou et al. |
| 5,295,256 A | * | 3/1994 | Bapat ........................ 717/137 |
| 5,499,371 A | | 3/1996 | Henninger et al. |
| 5,644,334 A | * | 7/1997 | Jones et al. .................. 345/419 |
| 5,748,966 A | * | 5/1998 | Sato ........................... 717/131 |
| 5,819,092 A | * | 10/1998 | Ferguson et al. ........... 717/113 |
| 5,832,498 A | | 11/1998 | Exertier |
| 5,860,007 A | * | 1/1999 | Soni et al. .................. 717/121 |
| 5,963,739 A | * | 10/1999 | Homeier ..................... 717/126 |
| 6,058,397 A | * | 5/2000 | Barrus et al. ............ 707/104.1 |
| 6,161,134 A | * | 12/2000 | Wang et al. ................ 709/220 |
| 6,192,365 B1 | * | 2/2001 | Draper et al. ............... 707/101 |
| 6,343,375 B1 | * | 1/2002 | Gupta et al. ................ 717/152 |
| 6,343,376 B1 | * | 1/2002 | Saxe et al. .................. 717/154 |
| 2002/0143655 A1 | * | 10/2002 | Elston et al. ................. 705/26 |
| 2003/0004963 A1 | * | 1/2003 | Kagalwala et al. ......... 707/103 |

OTHER PUBLICATIONS

"The Source for Java™ Technology" Website: java.sun.com, 2 pages, Nov. 30, 2000, http://www.java.sun.com/products/javabeans/infobus.
"JNDI Java Naming & Directory Interface™", JavaSoft, Sun Microsystems, 2 pages, Jan. 1998, http://www.java.sun.com/products/jndi.

* cited by examiner

Primary Examiner—Wayne Amsbury
(74) Attorney, Agent, or Firm—Akin Gump Strauss Hauer & Feld LLP

(57) ABSTRACT

A computer implemented process accesses data stored on one or more computers, the data on each computer having a data storage schema. A program is generated to access the data using terms and constructs of a semantic programming interface. The semantic programming interface provides an abstract, object-oriented representation of the data that is independent of the data storage schemas of the data. Mappings of the representation of the data in the semantic programming interface to each of the data storage schemas of the data stored on the one or more computers are created. The data mappings are used to translate the interface-based program into one or more executable programs. The executable programs are run to access the data stored on the one or more computers. System security and data security are maintained on the one or more computers.

33 Claims, 7 Drawing Sheets

DATA STORAGE SCHEMA INDEPENDENT PROGRAMMING FOR DATA RETRIEVAL USING SEMANTIC BRIDGE

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The present invention relates generally to a system and method for retrieving data. More particularly, the present invention relates to a system and method for retrieving data from any computer system, the data having either known or unknown data storage schemas, using a semantic programming interface that allows programs to be written on abstract, shared objects, the programs representing the semantic specifications for the intended operations, and a semantic bridge to translate the intended operations to executable programs that preserve the original semantics.

The computer systems of the past decade were designed to provide the necessary information for the efficient working of a single organization. As the connectivity between organizations improved, however, the advantages of efficient information exchange between organizations became obvious. The lack of an efficient means of information exchange between the massively interconnected computer systems prevents these advantages from being realized and is a major impediment to growth, even today.

Each organization has a conflicting set of goals—allow external agencies (EA's), namely, any user or system located outside of the organization, to get from its system any kind of information the EA's are permitted to see while preventing the EA's from getting any information they are not permitted to see. Furthermore, unknown users cannot be given open access to the system to insert, modify or delete the data. If the organization publishes its data storage schema so that EA's can write their own programs and execute them, it makes it possible for users to get whatever information is available. But it leads to data security problems for the organization and a different kind of problem for the EA's. The EA's usually need to gather information of the same kind from a lot of different sources. The EA's cannot efficiently develop a different set of custom programs for each organization with which they work. Indeed, such a task would be massive and a maintenance nightmare.

Moreover, the present attempts to overcome these problems have not been very successful. For example, the Common Object Request Broker Architecture (CORBA) provides one method of accessing data from remote systems. With CORBA, an Object Model defines common object semantics for specifying the externally visible characteristics of objects in a standard and implementation-independent way. In this model clients request services from objects through a well defined interface specified in an Interface Definition Language (IDL). A client accesses an object by issuing a request to the object. The request is an event, and it carries information including an operation, the object reference of the service provider, and actual parameters (if any). The object reference is an object name that defines an object reliably.

CORBA is disadvantageous for several primary reasons, however. First, users of CORBA objects are limited to the specific operations that have been defined by the creators of the objects—e.g., they are limited to the specific procedures or methods that have been associated with the CORBA objects. There is no way for a user to add additional procedures to the system. Thus, users are limited in the ways that they can access data due to the fixed functionality of CORBA code. Indeed, the coarse-grained nature and fixed functionality of CORBA code makes it rigid and inflexible.

Second, CORBA objects are accessed using a typical client/server model. The client (e.g., user) code to perform the data access executes locally on the client machine. A CORBA object is accessed by the client code by issuing a request to the object through a remote procedure call (RPC) mechanism. The request is handled by the remote server, which returns results to the client machine. This access mechanism is slow and inefficient due to the number of RPC's needed whenever data has to be accessed.

Third, CORBA is hard to standardize across an entire application domain. The difficulty stems from the fact that the developers of the CORBA objects and the users of the CORBA objects may be unconnected. To avoid misuse of these objects, there has to be a unanimous agreement on the nature and scope of the methods in the interface. To provide the functionality required of all possible users in all possible deployments of the 'standard' CORBA objects is hugely inefficient (all implementations should provide the same solution in different ways for all possible methods), and provides no real incentives to the developer of the CORBA object. Hence, the advantages to be gained from standardization (such as real write once and run anywhere, abstract programming solutions etc.) will be practically impossible for anything but small self-contained domains.

Enterprise Java Beans (EJB) provides another method of accessing data from remote systems. EJB conceptually divides the interface the EJB server provides for storing state information into two parts—the data side and the client side. The "entity bean" has a one-to-one relationship with data in tables. The "session bean" has a one to one relationship with the client and allows the client to store state information. Accessing data is through the process of "finding" the appropriate entity beans. The "finder methods," invoked by the client, on the "home" object, are passed to the entity beans, by the EJB "container." The finder methods are special purpose methods used to identify the data with which the client wants to work. This is no different from a typical program where the programmer assumes the responsibility for ensuring that the proper relationships for meaningful computations are maintained between participating entities. The relationships are only implicit. The EJB model does not specify the need for more powerful denotations. As a result, a deployed entity bean is static. It cannot service the need for accessing information with differing structural relationships. Thus, the EJB model is only of limited utility.

Similarly, Multi-Tier Distributed Application Services (MIDAS) provides another method of accessing data from remote systems. MIDAS is designed for quickly and easily developing and deploying multi-tier thin-client database applications. MIDAS can access remote data through HyperText Transfer Protocol (HTTP), and other transport methods, however both sides of the application (i.e., client and server) must be pre-programmed and run against known data structures. Thus, like the EJB model, MIDAS is only of limited utility as it cannot be run to access data from databases having unknown storage schemas. Moreover, both the client and server sides of a MIDAS application would have to be rewritten every time the storage schema of the known data structure changed.

Accordingly, there is an unmet need for a general-purpose method for retrieving data from any computer system, the data having either known or unknown data storage schemas, using a semantic programming interface that allows programs to be written on abstract, shared objects. There is also a need for a semantic programming interface that denotes the names and meaningful relationships among data and declares them as methods associated with the objects, thereby allowing users to access the data in any way they want. There is also a need for a method that allows user code to be dynamically built and executed on a server computer. The present invention fulfills these needs.

BRIEF SUMMARY OF THE INVENTION

Briefly stated, the present invention provides a method of accessing data stored on one or more computers, the data on each computer having a data storage schema. In the method, a program is generated to access the data using terms and constructs of a semantic programming interface. The semantic programming interface provides an abstract, object-oriented representation of the data that is independent of the data storage schemas of the data. Mappings of the representation of the data in the semantic programming interface to each of the data storage schemas of the data stored on the one or more computers are created. The data mappings are used to translate the interface-based program into one or more executable programs. The executable programs are run to access the data stored on the one or more computers.

In another embodiment, the present invention provides a method of accessing from a client computer data stored on one or more server computers, the data on each server computer having a data storage schema. In the method, a program is generated at the client computer to access the data using terms and constructs of a semantic programming interface. The semantic programming interface provides an abstract, object-oriented representation of the data that is independent of the data storage schemas of the data. Mappings of the representation of the data in the semantic programming interface to each of the data storage schemas of the data stored on the one or more server computers are created. The interface-based program is transmitted from the client computer to the one or more server computers. The interface-based program is translated into one or more executable programs using the data mappings at the one or more server computers. The executable programs are run on the one or more server computers to access the data from the one or more server computers. The data accessed from the one or more server computers is then returned to the client computer.

In yet another embodiment, the present invention provides a method for specifying a semantic programming interface for use in accessing data stored on one or more computers. In the method, computationally meaningful relationships between the data and computationally meaningful groupings of the data are identified. The data are represented as objects, each object having associated method. The computationally meaningful relationships and computationally meaningful groupings are declared as methods associated with the objects.

In yet another embodiment, the present invention provides a method for executing on a server computer a source program written on a client computer. In the method, the source program is transmitted from the client computer to the server computer along with an identification of a program domain for which the source program is written. The source program is stored on the server computer. A program loader capable of loading classes in the program domain and the code in the source program is instantiated on the server computer. The source program is compiled on the server computer and the compiled program is loaded using the program loader. The compiled program is then run on the server computer.

Finally, in yet another embodiment, the present invention provides a method of creating and executing one or more programs on a client computer for accessing data from one or more program domains, the data stored on one or more server computers. In the method, the one or more target program domains and the one or more target server computers of interest are identified. Code is generated to access the data from the one or more server computers (requests) using terms and constructs of a semantic programming interface, the semantic programming interface providing an abstract, object-oriented representation of the data that is independent of the data storage schema of the data. Code is also generated to handle any output received in response to the requests (response handlers). The requests and response handlers are combined to form chores. The chores are then queued for execution.

BRIEF DESCRIPTION OF THE DRAWING

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Figure 1:
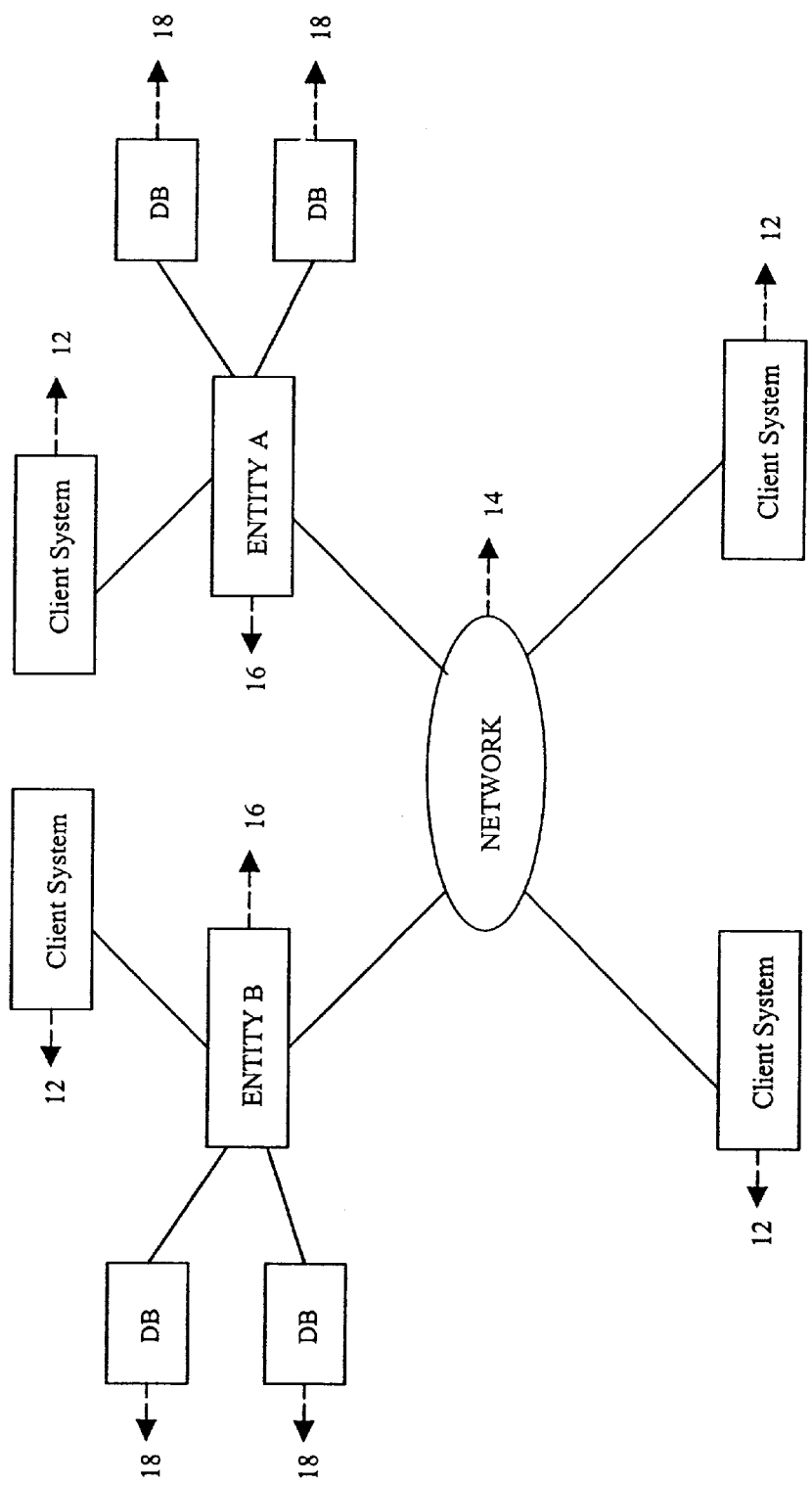
FIG. 1 is a high-level block diagram of a network architecture in which the present invention may be implemented.

Certain terminology is used herein for convenience only and is not to be taken as a limitation on the present invention. In the drawings, the same reference letters are employed for designating the same elements throughout the several figures.

The present invention is described in the context of a method of accessing data stored on one or more computers over a computer network such as the Internet or an Intranet. As shown in FIG. 1, a typical computer network 10 contains one or more client computers 12, either connected directly to a network 14 or indirectly through entities 16, which in turn are connected to the network 14. The entities 16 represent organizations that may contain one or more of their own computer systems networked together through a LAN or WAN (not shown). The entities 16 also contain one or more databases 18. The databases 18 can potentially be accessed by internal users, represented by the client systems 12 connected directly to the same entity 16 as the database 18, as well as external agencies (EA's), represented by any client system 12 connected to a different entity 16 than the database 18 or any client system 12 connected directly to the network 14 (i.e., a client system 12 not part of an entity 16).

The present invention allows the EA's to write their own programs that can work on different databases 18 within the security framework formulated at the data sources by the entities 16. The programs will be easy to write because of the higher level of abstraction involved. The Database Administrator (DBA) will also find the task, of making the data available within the framework of the security policy, easy to accomplish. The combination of an acceptable solution for all concerned is the only basis on which a viable standard that can greatly benefit everyone can be developed. The solution disclosed herein would be an ideal model on which to base the standard.

The fundamental philosophy behind the solution of the present invention is that the DBA's should be able to define the rules for the set of Tables, rows and fields in databases 18 that should be accessible to a given user (possibly external), and then the user should be able to retrieve that information and process it any way he/she wants. The user should not have any further constraints in the program development—either in the logic of data retrieval or the processing of the retrieved data. The data retrieved and processed in this manner can be stored locally along with similar data collected from other sources for farther analysis. This way it is possible to automatically gather and analyze information obtained from various sources.

The present invention is a method and system for writing a whole new class of computer programs. The method consists of a Semantic Programming Model (SPM) that allows programs to be written on hypothetical, Shared Objects using a Semantic Programming Interface (SPI). These programs represent the semantic specifications for the intended operations. An instance of a Semantic Bridge (SB) that implements the SPI is used for each data storage schema to translate the Interface-based programs to executable programs that preserve the original semantics of the programs. The method of the present invention makes it possible to write sophisticated data gathering applications without any intimate knowledge of the databases 18 and without any compromise on the security policies of the entities 16—either data security or system security. This is of immense importance for developing standards that will greatly enhance code reuse.

Figure 2:
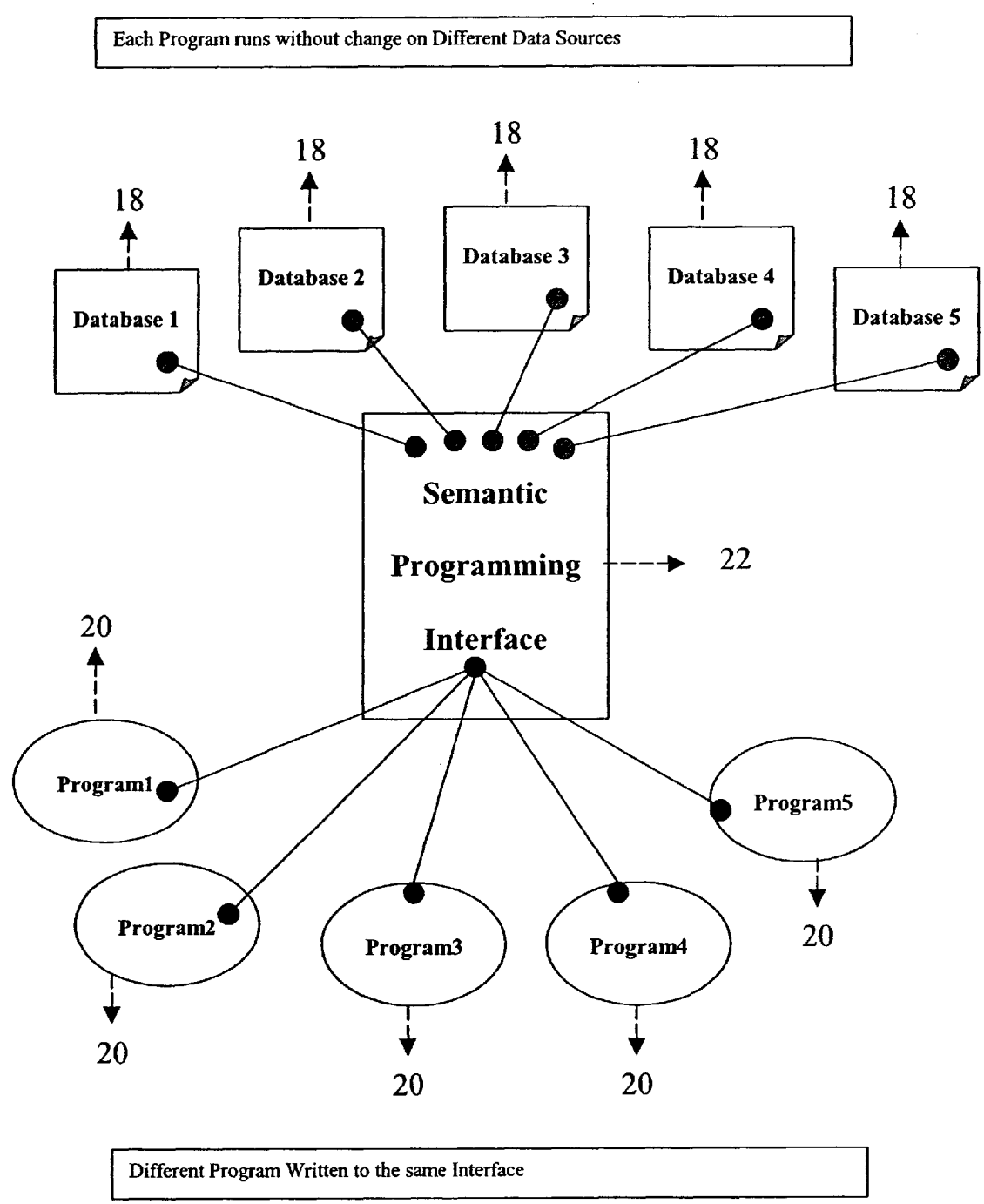
FIG. 2 is a high-level block diagram of a preferred embodiment of the present invention.

For example, as is seen in FIG. 2, various programs 20 can all be written on one or more client systems 12 using the same Semantic Programming Interface 22 within a given domain. The programs 20 can be written without any knowledge of the structure or workings of the databases 18. Assuming that the DBA's of the databases 18 have all written a Semantic Bridge (SB) that implements the SPI, each of the programs 20 can be run without change on each of the databases 18.

The present invention specifies the following:
1) The design requirements of Shared Objects and the Semantic Programming Interface;
2) The principles for writing programs using the Shared Objects of the Semantic Programming Interface; and
3) The techniques for constructing the Semantic Bridge, or implementing the Semantic Programming Interface.

The primary goal of the system and method of the present invention is to be able to read external data, and not to create, delete or in any way modify the data. The data read from the external database 18 can be stored on the local client system 12, but the external database 18 cannot be modified in any way. Therefore, in applications where data needs to be transferred to an external system, the interaction between the two systems should be designed such that the external system makes the request for information and uses the response to update its own data. This is primarily a security measure and should remove one of the major apprehensions DBA's might have about data integrity if unknown programs are allowed to execute on their databases 18.

Though the primary focus of the present invention is on retrieving external data, the methods described herein can also be used for accessing local data. Used this way, program maintenance will be easier, and a high degree of code reuse—much higher than present levels—is possible. The advantage in code reuse stems from the fact that the solution using the Semantic Programming Interface is an abstract solution. One can even use this solution in other systems with very different data storage schema. One can use solutions developed by others. Once a good abstract solution is developed it can be used by anybody and everybody. The same problems need not be solved again and again. The advantage gained has a snowballing effect associated with the extent of deployment of the Semantic Bridge in a given domain.

Shared Objects and the Semantic Programming Model

Programs written for a given domain can use one of many possible models of the domain. By "domain," we mean an area of human activity that uses a computer based information management system. The key elements and concepts in this human activity are collectively referred to as a domain. Examples of domains are: hospitals, hotels, banking, merchandising, etc.

Shared Objects is one such model for a domain, but needs to meet specific requirements (stipulated by the SPM). The purpose of the model is to allow users to write programs using terms and constructs in the Semantic Programming Interface (SPI) as part of the Shared Object model. Design goals of the SPI are as follows:

1) The ability to construct programs that are as simple and as powerful as possible;
2) The implementation of the SPI by the DBA should be as easy as possible; and
3) The SPI should work correctly for all possible programs and all possible data sources.

The user programs written using the SPI are developed on the guarantee that the semantics of all relationships in the model will be ensured in all implementations of the Interface. The implementation of the SPI sets up the Semantic Bridge (SB).

The underlying assumption behind this approach is that it is possible to divide the model of a domain into (1) fundamental properties (dependent only on the domain itself) and (2) implementation specific properties. For example, a concept in a domain is fundamental whereas the term used to express the concept is implementation specific—e.g., the concept is the same even if we choose to use a different name to represent it. This highlights the distinction between a denotation, and what is denoted. The denotation is implementation specific while the denoted entity is not. Therefore, the ability to programmatically replace one denotation with another is of fundamental importance in developing implementation independent programs. Furthermore, we need to be able to write programs wherein all the denotations can be replaced depending on the implementation.

In a typical program however, all the denotations are not explicit. For example, an object that bears a certain relationship with another object may be necessary in a certain operation. But the programmer usually assumes the responsibility to see that such a relationship exists, and there usually is no explicit way to denote the fact that a relationship should hold. Also, the relationships can be implemented differently—for example, left in one system and right in another—so that it is possible to derive one from the other, and accordingly the operation to produce the equivalent output may be different. The SPI and SB described herein are capable of handling these issues automatically.

For computations to be meaningful, it is necessary that certain relationships exist between entities participating in the computations. Some computations are meaningful only if the terms involved represent the properties of the same entity. For example, the equation:

$$\text{area of rectangle} = \text{length} \times \text{width}$$

is meaningful only if all the properties (e.g., length and width) refer to the same rectangle. Thus, the terms such as length, width, etc., have this implicit association and any replacement of these terms must ensure that the relationship (that they are properties of the same rectangle) still holds after their replacement.

Even though the Object Model allows one to infer that a set of properties belongs to a single entity, there are cases wherein the terms in a computation should come from different entities and these entities should bear certain specific relationships. For example, in the equation:

$$\text{total price} = \text{unit price} \times \text{qty sold}$$

the operands on the right hand side are properties of different entities and if the entities do not bear a specific relationship, the computation will be meaningless.

The principles for the design of the Semantic Programming Interface in the Shared Objects are an extension of those of the present Object Oriented Model. The extension stipulates that the SPI should have the means of expressing complex denotations (as explained in detail below) in the domain within the framework of the relationships defined. In all programs, the objects to be used should be explicitly identified, before they can be used in any computation. It is this ability, to explicitly specify the complex denotations, using Interface members, and the ability of the program to call appropriate implementations at runtime, that allows one to execute the same program on different data sources, without changing the meaning of the program.

An entity can be denoted directly, or indirectly, using its relationship with other entities. For example, the same individual may be referred to as X or fatherOf(Y) or the onlySonOf(Z) etc. The indirect denotations help establish the identity of the entity and relate the entity to other entities. In other words, given the identity of an entity participating in some computation, the identity of some other entity also participating in the same computation can be denoted using the relationship that is necessary to make the computation meaningful. With denotations of this kind, and the special code to identify entities indirectly referenced in this manner, it is possible to guarantee that the semantics will be preserved for all implementations.

The SPI thus uses declarative syntax to identify the entities participating in a computation. Clearly, this has significant advantages (from the point of view of maintenance, ease of understanding, reuse etc.) over the procedural code necessary to identify the entities involved in a computation.

The fundamental entities in the Semantic Programming Model are objects, object identifiers, properties, methods, relational references and denotations. Relational references are special methods that return object identifiers. If the semantics of the relationship is such that it can only return one possible identifier, it is a unique reference. If a relationship can return multiple identifiers, it is a group reference. Denotations are based on special syntax used to refer to a single identifier, or a set of identifiers having some special relationships/properties. With the help of these denotations, it is possible to refer to objects indirectly, and with more semantic information. During model development, for a given domain, one should identify the computationally meaningful relationships between the objects. Computationally meaningful groupings should also be identified. These are declared as special methods associated with the objects in the model. These methods return one or more object identifiers. These methods and the parameters passed to them, together, are said to denote the objects of interest in that class.

The programs written using this model require the programmer to denote the objects of interest by specifying the properties and relationships (using member methods and member properties from the Semantic Programming Interface of the Shared Model classes) that must be satisfied by each of the objects participating in a computation. With the help of these, the programmer can easily write code to construct objects having specified properties and relationships. Once the objects are built, the properties of these objects can be accessed and operated upon. This is how complete programs may be constructed, using only the terms in the hypothetical Shared Model (hypothetical because there may possibly be no data source that matches the Shared Model). The terms in these programs will be interpreted to represent the terms in the implementation at the time of program execution, using the implementation for the Semantic Programming Interface provided by the DBA.

To implement the Semantic Programming Interface on a data source for a given domain, the Shared Model for that domain should be mapped to the data storage schema used at the data source. This involves a field level mapping that preserves the implied relationships between entities in the Shared Model. For example, the Shared Model might require that an identifier in a certain field represent the rightOf(x) relationship with the identifier 'x' in the same row. If the data source is designed to provide the same information indirectly, by storing the leftOf(x) for instance, then the mapping will involve providing the query that returns the identity of the entity for which 'x' will be in the leftOf(x) field. Therefore, the mapping process involves associating the Shared Model variables with expressions built from database fields (using Structured Query Language (SQL) syntax, or other any suitable syntax, so that these can be used in subsequent queries). The database fields may come from one or more rows from one or more tables. The list of tables and the join conditions should be explicitly specified and the resultant semantic associations between the database fields/rows should match those in the Shared Model. The following section describes this process in greater detail.

The Semantic Bridge

The purpose of the Semantic Bridge is to identify the denoted entities in user programs and to build the denoted objects when requested. The implicit relationships that exist in the Shared Model and the implicit relationships that exist in the database are mapped explicitly by the DBA. This mapping code is used automatically at runtime to construct the SQL queries to gather the data requested in the user programs.

Consider, for example, a Shared Model object called "Item" with properties ItemNumber, ItemNumberOnRight, and ItemName. A database system for this domain has implemented this as IDofThing, IDofThingOnLeft, and NameOfThing, stored in "table1." A DBA mapping this to the Shared Model will setup entries in a specially designed database that will be accessed by the classes in the domain to construct the mapping methods and the database views needed to access the data in a manner transparent to the users. For example, using the Java programming language with SQL and Java Database Connectivity (JDBC), the following type of method could be used:

```
private String mapping(String input)throws Exception{
    // 'input' is the Shared Model property of this object.
    // This method returns the expression that maps the data to the
```

```
        // Shared Model Properties.
        // This is done, by accessing a database where the DBA has
        // entered this information.
        // The database access uses the doPrivileged method - see the
        // security section below for more detail
}
```

Instead of a table, property/value pairs of Java properties objects or a suitably designed XML document or even a database can be used. However, the best approach is to generate a dynamic SQL statement that generates a "view" that makes the information in the database look like a view of the objects in the Shared Model. At this point, any row level security the DBA wants to introduce can also be included. At the point when the above method is called, the identity of the user will be known to the system. This can be used to impose row level restrictions as well. For example, if a user is to be allowed to access only a limited set of accounts in an accounts table and this set of permitted accounts is itself stored in a table, the condition added to the select clause in the view definition will include a sub-query such as:

accountID in (Select accountID from accountsPermission where user=userID)

For the example given above, the following view definition is required. Except for the sub-string referring to the row level security, the rest of the string is a constant for a given implementation and this is provided by the DBA as an entry in a database table, which is accessed to construct the view. The row level security is entered in a different table and is dependent on the user and the Shared Model Object that is being mapped. The design of these tables is straight forward, and is not elaborated here. A routine that reads these tables is used to dynamically generate the SQL statement below and create the temporary view. This view has a one-to-one relationship with the Shared Model Object and standard SQL queries can now be built using this view. However, there are some constraints imposed from the security point of view as discussed later.

```
   create view ItemUserxx [ItemNumber, ItemNumberOnRight, Item-
       Name] as select table1A.IDofThing, table1B.IDofThing,
       NameOfThing from table1 AS table1A, table1 AS table1B
       where (table1A.IDOfThing=table1B. IDOfThingOnLeft) [and
       (row level security constraints)]
```

If any data type conversion is necessary, that also needs to be done in the mapping expression and view definitions (using SQL data type conversion functions). If any mismatch exists between the units specified in the Shared Model and the database, the DBA needs to use the appropriate conversion factor for that also.

The DBA enters the mapping information into specially designed tables. The Shared Model has special methods that will automatically read these tables and dynamically generate the SQL statements that will create "views" of the database like the sample "create view" shown above. Note that the views are user-specific and temporary. When the program terminates, all the created views are dropped.

For each of the objects in the domain, a method such as the one below is implemented to construct the object from its identifier:

```
public void createItem(String identifier)throws Exception{
    String s1 = "select * from ItemUserxx where ItemNumber =" +
        identifier
/*
 *   The database access is performed using privileged access.
 */
    ExecuteQuery eq = new ExecuteQuery(s1);
    fillObject((rs1 = eq.getResultSet( )));
    }
/*
 * This method is used for filling the object variables by means of
 * ResultSet values (rs1).
 */
protected void fillObject(ResultSet rs1)throws SQLException{
    // The colunm values in the ResultSet rs1 are assigned to the object
    properties
    // here. A security check is also performed to ensure that only the
    properties
    // that can be seen by the user are assigned the true values.
    The properties the user // is not permitted to see are set
    to null values.
}
```

By asking the DBA to reason about implied relationships during mapping, we have essentially partitioned the problem between the user and the DBA—the user program needs to handle the procedural aspects alone and the DBA will handle the logic and reasoning that ensures proper mapping. Resolving the differences in terminology, interpreting the relationships, figuring out what is required, and determining the means of getting that information, are all hard tasks for pure knowledge based systems. However, mapping is a simple matter for seasoned programmers. The use of expressions or aggregating sub-queries depending on the structure of the underlying data, are all simple tasks for humans. If the version of SQL supports calls to external functions (in a select clause), DBA's can even use functions to map the fields. If the computation is complex and function calls are not supported, the DBA may consider adding the field to his database. The point that is emphasized here is that the partitioning of the problem greatly simplifies the solution. If the mapping process also has to be automated, the sophistication of the knowledge base, and the reasoning capabilities required of the program, have to be far greater.

In the mapping process, certain exceptions will also have to be handled. If the database has not at all captured some field that is used in the Shared Model class, then the DBA should map the field to a "null." The effect of this is that, if the user denotes objects of this type with specific property values for this field, the three-valued logic of SQL will return "UNKNOWN" for the boolean expression referring to this field and not produce a SQL runtime error. The designer of the Shared Model should preferably keep this in mind and should try to make the model as general as possible.

From what we have so far, using the mapping process, the properties of the objects can be retrieved, if the object's identity is known. How to specify the objects of interest and gain access to their identifiers is discussed in the next section.

The Semantic Programming Interface

An important aspect of the Shared Model and its Semantic Programming Interface is the denotation methods and the ability to combine the denotations to build more complex denotations. The objects of interest can be denoted with the help of useful relationships in the domain. For example, the position of a door relative to a customer may be useful in a robotic security system, but is irrelevant in a business application. It does not make sense to refer to a customer as the one standing near the door in the business application, but may make a lot of sense in the security system. In the business application, denotations such as, for example, the customer who paid using Amex card Number xxxxx, make much more sense. Similarly, objects of interest can also be denoted using properties. Like in the case of relationships, here again, the properties should be meaningful in the domain. A customer denoted by his credit line is more useful than one denoted by his receding hairline, in a business application. It is the responsibility of the modeler developing the Shared Objects to identify the useful relationships for the domain and include them in the Shared Model and in its Semantic Programming Interface.

The use of denotations allows the users to write programs in more abstract terms, making development easier, faster, and less error prone. Programs are also better controlled from the data security point-of-view because of the object-oriented approach. With this way of programming it is not possible to gain access to object properties directly. The user programs are forced to use the special "getmethods" (described below) associated with each property. The DBA enters access control restrictions on certain properties like the way the mapping information is entered—into a separate table. The getmethods check the constraints and hide the values of the restricted fields. This way, apart from the row level security using views (and permissions granted for each user), field level security can also be enforced. For example, the user might be permitted to see the quantity of a certain transaction but not the price.

In the sample customer class for the business domain shown in Appendix A, the relationships are implemented as methods that return strings that can be used to construct complex "where" clauses for SQL query strings. The SQL statements constructed using these clauses will return, when executed, zero or more customer identifiers having the properties and relationships specified. Each method relates the customer objects with some other object. For example, getCustomerFromInvoice is used to build the "where" clause for customers associated with the invoice objects.

All of the methods of this kind need to specify certain essential information. In general, the information necessary for referring to objects using relationships are:

1) The kind (class) of objects of interest;
2) Properties the objects of interest should have;
3) The relationship and the role in which the objects of interest should participate; and
4) A similar description that limits the range of the related objects.

The sample implementation shown in Appendix A to explain these concepts uses String functions with three parameters. The first parameter is the Shared Model identifier property for the object that is denoted. The second parameter allows one to specify the properties the qualifying objects should have. The third parameter is used to specify the properties and relationships the related object—invoice in the example above—should have. This is a means of qualifying the invoice objects that are related to customer objects of interest.

All the objects in the domain have similar methods that allow them to relate to other objects. So, it is possible to combine the relationships to select, for instance, customers with some properties and having a specific relationship with another set of objects that have specific properties and have a specific relationship with some other set of objects, and so on. The SQL strings constructed just get concatenated to represent the complex semantics of the denotation. All of the information needed to construct the SQL query, even in the case of very complex queries, is automatically obtained from the denotative methods.

In the sample implementation shown in Appendix A, every object has a getSubQuery<objectName> method like the getSubQueryCustomer method set forth in Appendix A. This takes care of translating and building sub queries. The "select" method, also shown in Appendix A, is used to get the objects required. Each Class has an identical select method. These are the methods that help denote objects in their classes. The objects can be denoted by their properties and/or their relationships with other objects. The syntax used for these denotations allows one to combine various selection criteria and also qualify the objects referenced in the relationships.

The parameters help identify the objects denoted. The first parameter is used to specify the properties the qualifying objects should have. This is a string of property constraints given using Shared Model variables and SQL syntax. This can also be a function that returns a string that can be used in the "where" clause of the SQL Select statement. For example, the getTopNInvoices method in the invoice class can be used to select invoices or the return value of that method can be combined with another string to generate more complex property constraints.

The second parameter is used to specify the relational constraints for the qualifying objects. Here again it is possible to combine and extend the relationships by using combinations of strings and functions that return strings, which can be used in the "where" clause. The main difference between the first string of property constraints and the second string of relational constraints is that the relationships are checked with a sub-query by determining the existence of an identifier in a list of selected rows from a different table. This is based on the semantics of the relational database systems wherein a relationship between entities is denoted by the existence of a row in a specific table in which the identifiers participating in the relationship appear in specific fields. Since the DBA has ensured that the relationships implied in the Shared Model are mapped correctly, like in the leftOf/rightOf example discussed above, the denotations in the user program will be accurately translated in the query.

Denotations Explained

A set of objects is denoted by some common properties or the relationships the objects bear with another set of objects. Let A, B, C, etc. represent sets of objects of different types. If B represents objects that signify relationships of type 'b' between objects of types A and C, the fields in B will include IdentifierOfA, IdentifierOfB, and IdentifierOfC. The relationship 'b' is said to exist between an instance of A and some instance of C only if both their identifiers are found in some instance of an object of type B. Furthermore, the objects A and C are said to have specific roles in the relationship 'b'.

Objects can be denoted using the relationships and roles they play in the relationships. When we talk about relationships, there are at least two sets of objects and these second set of objects in turn may be denoted using the same mechanism. Depending on the nature of the relationship between the sets, we may want to denote the entities in the first set that relate to all/none or at least one of the entities in the second set. In addition, the various set operations (such as union, intersection etc.) can be performed while specifying the denoted entities.

Figure 3:
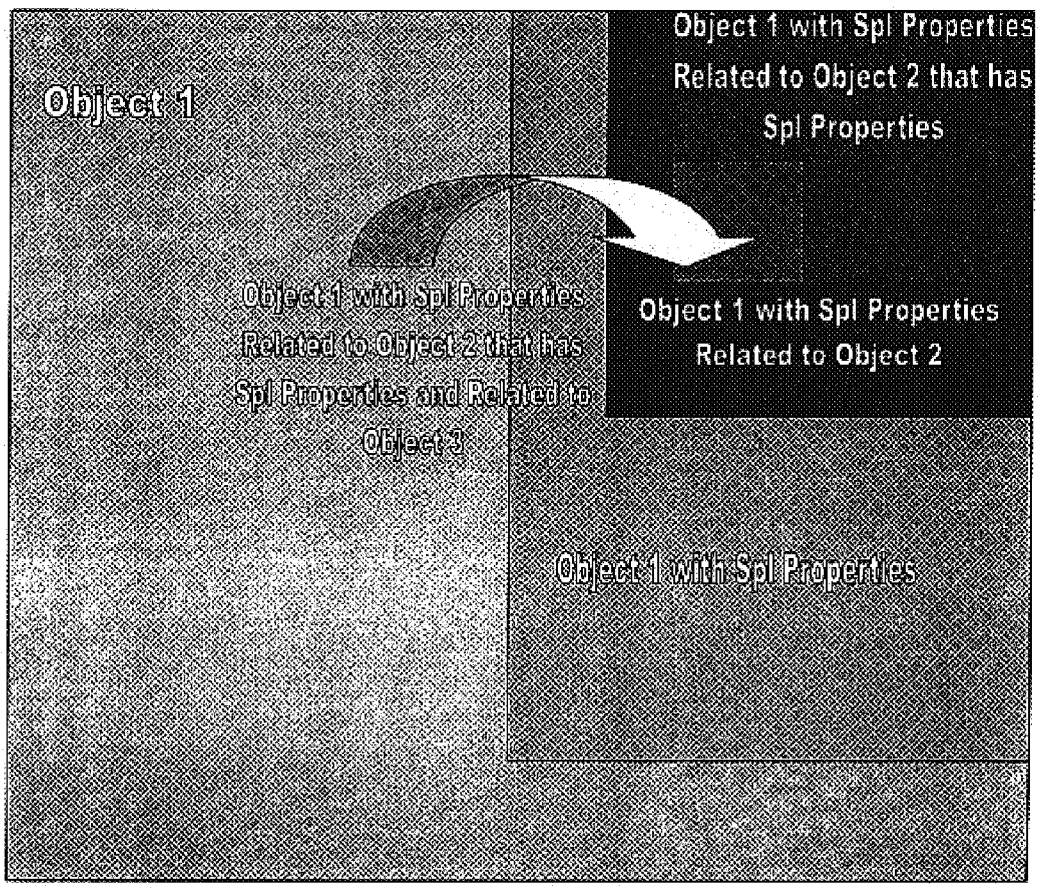
FIG. 3 is a set diagram of a sample object denoted using the Semantic Programming Interface of a preferred embodiment of the present invention.

The fact that all the above methods of denoting entities are well supported by standard SQL is the key that makes this approach very attractive. For example, the SQL that may be generated in general for the object relationships shown in FIG. 3 is as follows:

---

Select Distinct Object1_ID from view1 where
    (special properties predicate for Object1) and
    Object1_ID in (Select distinct Object1_ID from view2 where
    (spl properties predicate for Object2) and
    Object2_ID in (Select distinct Object2_ID from view3 where
    (spl properties predicate for Object3)));

---

Figure 4:
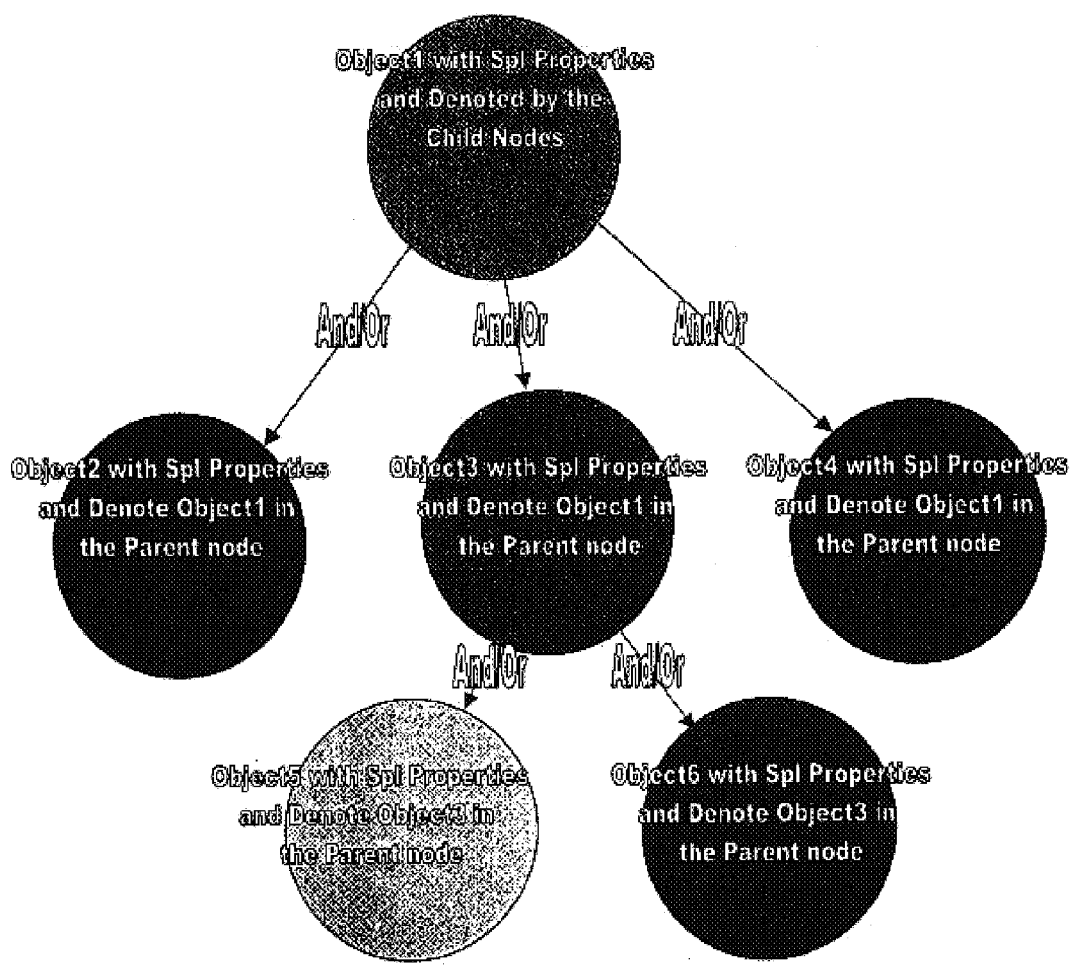
FIG. 4 is a tree representation of the denotation of sample objects using the Semantic Programming Interface of a preferred embodiment of the present invention.

Here, "view2" is a representation of an object that implies the required relationship between Object1 and Object2 and "view3" implies the relationship between Object2 and Object3. Instead of the conjunctions used, disjunctions or various combinations of conjunctions and disjunctions can be used to arrive at different denotations. The relationships used in the denotation can be specified to imply that the elements of the denoted set are related to all/none/some of the elements of another set. The whole denotation can be represented as a tree, as shown, for example, in FIG. 4, where each node represents a set of objects, and child nodes are used to denote the parent objects. The structure cannot have cycles because circular references in denotations are not permitted.

From the description above, it can be seen that the user has the ability to specify very complex "where" clauses in the SQL "select" statement. In fact the user is not restricted to using the given denotations alone. Using the SQL views, data stored in the remote systems can be accessed as if the data were stored in the Shared Model schema, and it is possible to write programs with embedded SQL queries. But the denotative power of the proposed model gives the programmer the ability to write programs at a more abstract level. Any useful methods developed using this approach constitutes an abstract solution and is usable without change on any implementation. This enables greater code reuse and avoids solving the same problems over and over.

The "views" defined by the DBA permit the user to view only a subset of the available data. However, the DBA may wish to allow the user to see some of the properties of certain objects while hiding other properties. Under these conditions, it is also necessary to prevent the user from performing "searches" on these properties. Therefore, the property level permissions can take one of three values—0, 1 or '*'. '0' indicates that the user is not permitted to see this field at all. No search on the field can be performed as well. '*' indicates that the user is permitted to see the property values only for his own records, and searching may not be performed on these fields. '1' allows the user to view the property and also perform searches on this property. Using this information, the SQL queries are parsed and properties that should be inaccessible are replaced with nulls. If the program encounters an access violation in this respect, a security exception is thrown that the user has to provide the code to handle.

The "select" method returns a record set of identifiers with the specified properties and relationships. The set of identifiers returned is processed in a "while" loop. As explained earlier, an object is built for each identifier. This object may be used to find other related objects. This way any complex set of interacting objects can be constructed.

Since the implementation specific information is completely stored in special database tables accessible to the Shared Model objects, the DBA does not have to make any changes to any of the Shared Model classes. In fact, the Shared Model classes should be declared "final." The "get-methods" that enforce implementation-specific field-level access permission policies are shown in the following sample code:

```
public class Customer extends AbstractCustomer implements CustomerInterface{
/*
* A static initializer block should initialize the viewName and property level access
* permissions (containg a string of 1's, 0's and *'s as described in the text). This is
* done by accessing the utility class that authenticates the user and sets up the
* various user permissions.
*/
public Customer( ){
}
public String getcustID( ){
/* Check access permission for the field and if permission is denied set the field to
* null and throw a security exception
*/
    return custID;
}
public String getcustName( ){
/* Check access permission for the field and if permission is denied set the field to
* null and throw a security exception
*/
    return name;
}
public String getAddress( ){
/* Check access permission for the field and if permission is denied set the field to
* null and throw a security exception
*/
    return addr;
  }
}
```

The Semantic Programming Interface seen by the user program developer for the customer class example discussed above is shown in the following sample code:

```
// Semantic Programming Interface for Customer Class
// In addition to the methods shown here there could be other useful class methods
// such as:
// printCustomerMailingList(String denotedCustomerSet).
// Methods to access property values:
```

-continued

```
    public abstract String getcustID( );
    public abstract String getcustName( );
    public abstract String getAddress( );
// Methods to help construct other queries:
    public String queryBuilder(node rootOfDenotationTree);
    public void treeBuilderAdd(node parent, node child);
    public void treeBuilderRemove(node child);
    public node nodeBuilder(String nodeDescriptor);
// Methods to navigate through the selected records:
    public boolean isNextIdentifier( );
    public String getNextIdentifier( );
// Methods used to denote Customers: This is not an exhaustive list
    public String select(String propertyconstraints,String subquery);
    public String getCustomerFromCustomerReceipt(String id, String
        propertyconstraints,String subquery);
    public String getCustomerFromInvoice(string id,String propertyconstraints,String
        subquery);
    public String getCustomerFromCustomer(string id,String
        propertyconstraints,String subquery);
    public String getCustomerFromSaleOrder(string id,String
        propertyconstraints,String subquery);
    public String getCustomerFromSalesRejection(String id,String
        propertyconstraints,String subquery);
    public String getCustomerFromChartOfAccounts(string id, String
        propertyconstraints,String subquery);
    public final void createCustomer(String identifier);
// CustomerListQuery and ProductListQuery use the 'select' methods for the
// customer and product classes.
    public String getCustomersBoughtAll(String CustomerListQuery,String
        ProductListQuery);
    public String getCustomersBoughtNone(String CustomerListQuery,String
        ProductListQuery);
```

The relationships/denotations in a domain can be very complex. For example in many-to-many associations, like, for example, with Customers and the Products they have bought, the following denotations are possible:

1) The set of Customers from a selected sub-set of Customers who have bought all/none/some Items from a selected sub-set of Items.
2) The set of Items from a selected sub-set of Items that have been bought by all/none/some Customers from a selected sub-set of Customers.
3) The top/bottom n Items based on some property (on which theta operators can be used).

The above denotations can also be combined with the simpler ones described earlier to construct really horrendous looking queries. But, the construction of the queries will be automatic. Neither the DBA nor the programmer has to worry about the query building process. The builder of the Shared Model simply has to provide the code for building the queries in a manner that fits in with the scheme for combining relationships (perhaps with the help of denotation trees), to produce useful denotations, without breaking the security features provided by the model.

Some of the implementation details of the Shared Objects were described above. However, the user who writes programs sees only an API consisting of properties and methods for the objects in the domain. The steps involved in building the Semantic Program are described in the next section.

The Semantic User Program

The user programs are preferably sent as Java source files with special headers that identify themselves as Semantic Bridge Programs. The header may also contain information that identifies and authenticates the user. The user program also may be required to follow certain protocols depending on the implementation of this server side code. For example, all programs preferably should be required to use a standard class name such as "SemanticBridge" or implement a standard interface such as the "SemanticBridgeInterface."

The following code shows an example Semantic Program:

```
// This is the User program //
public class SemanticBridge {
    Invoice i;
    public void operation( )throws Exception{
        i=new Invoice( );
        try{
        i.select(null,i.getTopNInvoices(3,"amount"));
        }catch(Exception r){
        // The I/O functions may have to go through Special
        Utility Class methods
        // that handle I/O under controlled conditions using privileged
        access.
        System.out.print("\n Select "+r);
        }
        try{
        while(i.isNextIdentifier( )){
        String g=i.getNextIdentifier( );
        i.createInvoice(g);
        System.out.print("\n"+i.getinvoiceID( ));
        }
        }catch(Exception r){
        System.out.print("\n while "+r);
        }
    }
    public void handleException(Exception e){
        System.out.println("\n Error "+e.getMessage( ));
        e.printStackTrace( );
        if(e instanceof SQLException){
            while((e=((SQLException) e).getNextException( ))!=null){
                System.out.println(e);
            }
        }
    }
}
```

Execution of the Semantic Program

The Semantic Program is compiled within a server program dynamically and executed. However, the rights and permissions for the user code are severely restricted so that no damaging actions can be performed. This is discussed in detail below in the section on Security Issues.

The code shown in Appendix B below describes how user code gets executed. In addition to the code shown in Appendix B, there will be code that identifies the user, determines the domain for which the program is written, assigns the security level for the user for that domain and sets up the security environment in which the code will execute. Also, the output produced by the user program has to be redirected to the user. Special code can be used to handle the standard output and standard error and the captured information can be sent back to the user using any of the standard protocols. As such code is well known to programmers of ordinary skill in the art, it is not discussed in detail herein.

Figure 5:
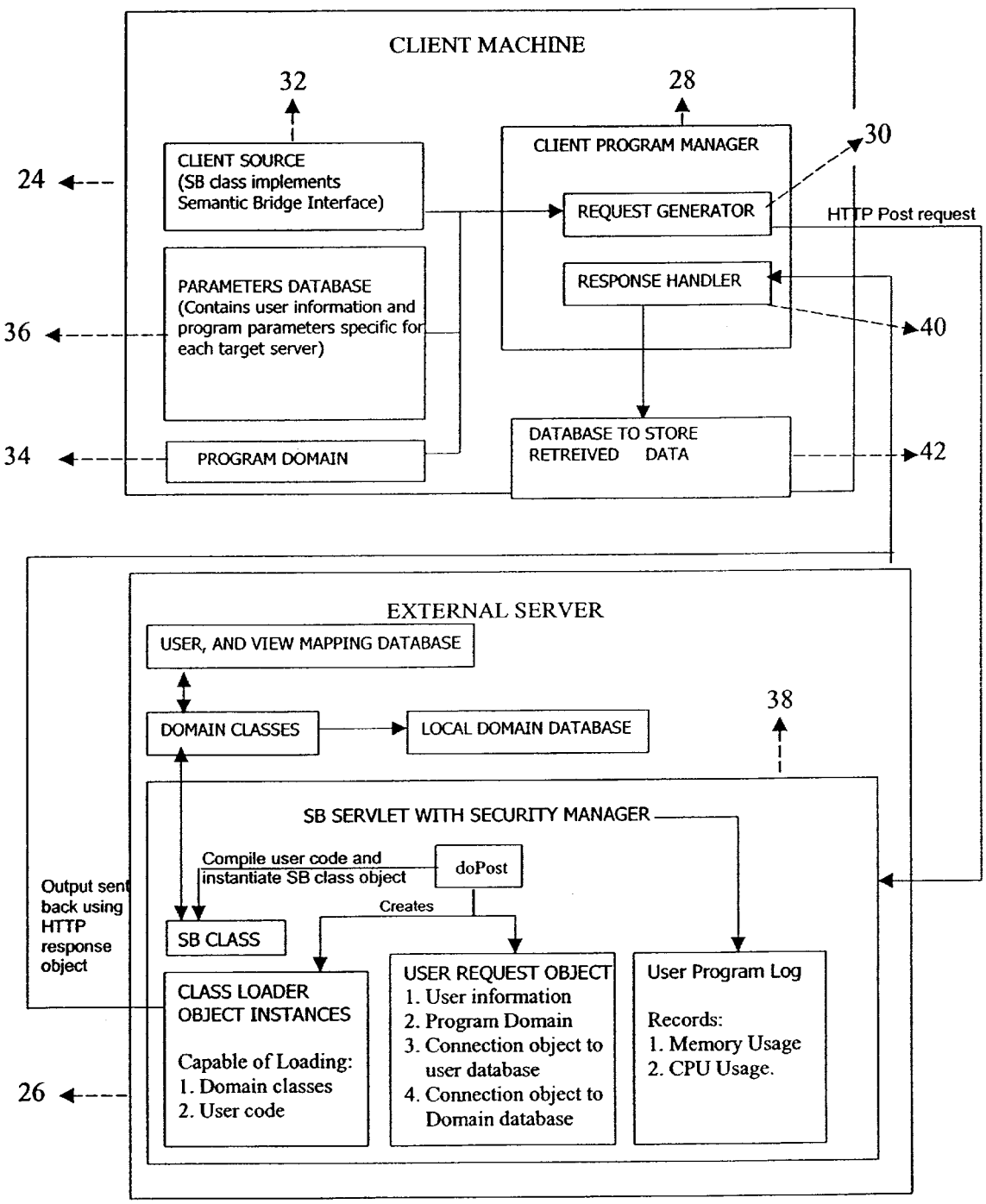
FIG. 5 is a schematic diagram of a preferred embodiment of the present invention.

Turning to FIG. 5, a schematic diagram is shown of the preferred process by which: (1) a user program is sent from a client machine 24 to an external server 26; (2) the user program is compiled and executed on the external server 26; and (3) the results of the execution of the user program on the external server 26 are returned to the client machine 24. On the client machine 24, the Client Program Manager 28 is the controlling element of the new class of application programs written using the Semantic Bridge System of the present invention. The Client Program Manager 28 manages the connection with external servers 26 and packages the requests and transfers the requests from the client machine 24 to the external servers 26.

The Request Generator 30 of the Client Program Manager 28 packages requests from the client machine 24 and sends them to one or more external servers 26. As described above, the requests include a user source program 32 written using the Semantic Programming Interface, which contains the program that the client wants executed on the remote database, as well as an identification of the program domain 34 for which the source program 32 is written. The external server 26 uses the program domain 34 to permit the incoming source program 32 to access the corresponding domain classes.

If a request is to be sent to multiple external servers 26, a parameters database 36 is preferably used to store certain site-specific information in a database (such as, for example, userID, password, user account number etc.) so that the Client Program Manager 28 can build custom request objects for each external server 26. The design of the parameters database 36 is straightforward and is not elaborated here.

Requests are preferably sent by the Request Generator 30 using the HTTP protocol. Protocols other than HTTP can also be used. For example, requests may be sent using a mail protocol and the responses can also be received using the mail protocol.

Requests sent by the Request Generator 30 are sent to one or more external servers 26 where they are received by the external servers 26 and sent to the Semantic Bridge Servlet (SB Servlet) 38. The "dopost" method of the SB Servlet 38 is subsequently activated.

The doPost method of the SB Servlet 38 performs the following functions. The user sending the request is identified and authenticated. A special temporary directory is created to store the user class file (e.g., the user source program 32). The domain for which the client code has been written is identified from the program domain 34 and a class loader capable of loading classes in that domain and the code in the user class file is instantiated. Two database connection objects are assigned to the request from two independent pools of available connections. One database connection is for internal operations—to fetch user specific database access permissions and information to build the "views" appropriate for the current user for the domain database. These are the "views" that will be used by the domain classes referenced in the user code. The second connection is used to access the actual data. The newly instantiated class loader is used to create a separate name space and a "user request" object is instantiated in that name space to store the references to the connection objects and user identification in static variables. The access to this object will be controlled through the class loader mechanism—the domain classes will be able to access this object while the user code will not.

The Class Loader is a key element in the Java 2 Security architecture. The SB Servlet 38 uses two user-defined class loader types. One type is used to load the classes in the compiled user package and the other type is used to load the application domain classes. One of each of these class loaders is instantiated for each user request (The SB Servlet 38 may service more than one user request at the same time and this facilitates isolation of name spaces). In addition, the class loaders permit the segregation of user code and application domain code (classes of the Shared Model) into separate protection domains. This allows the system of the present invention to have different security policies for the two domains and essentially confine the user code to a sand box. The security manager installed in the SB Servlet 38 dynamically enforces the security policy of the external server 26.

The user source program 32, which implements the Semantic Programming Interface, is compiled next and the class is stored in the temporary directory. The class is loaded using the instantiated class loader (described above) and the parameters that were sent with the request as Name-Value pairs and the reference to the 'print writer' object (this is the object returned by the getwriter method of the HttpServletResponse object in the HTTP protocol) are sent to the SB_Main method (of the Semantic Programming Interface) in the user's SB class as arguments.

The Java class loading mechanism will ensure that any domain classes used in the user's SB class will be loaded using the same class loader used to load the user's SB class. The effect of this is that any other user's SB class using the same domain classes will belong in a different name space (because that class loader instance will be different). Hence any static variables in these classes will be unique to the thread processing a given user request. Static variables in these classes are used to store the user specific information such as the "view name" and "field access permissions" for the current user. These fields are initialized automatically when the classes are accessed the first time.

The initialization code for the domain classes (generated by the developers of the domain classes) should set the correct value for the static variables mentioned above. This involves accessing the database where the system administrator has stored the "Shared model to Implementation mapping" information and the current user's row level and field level access permissions. Using the guidelines given here, the developer of the domain classes should design a suitable database for this purpose.

The SB class is permitted to access only the set of domain classes and runs essentially in a sandbox. This is enforced using the policy file and Java's Access Controller mechanism. However, the domain classes and some helper classes in the SB Servlet 38 need to have permissions to access resources—the same resources the user code is not permitted to access. So, when the request to access these resources originates from the user code, the Java runtime system will not permit the operations unless the methods in these other classes access these resources in privileged mode. These classes are specifically designed to do this whenever controlled system resources (such as the databases) need to be accessed.

The user source program 32 is written using the published public interface of the domain classes. The domain classes have special methods to return identifiers of objects denoted in a query and to build object instances for a given identifier. With object instances returned, the user code can perform various complex operations and computations, as described in detail above.

Any data to be sent back to the client machine 24 is managed by writing to the "print writer" object that was passed by the SB Servlet 38 through the Semantic Programming Interface. This is returned to the Response Handler 40 of the Client Program Manager 28 using the HTTP response object when the user code terminates. At this stage various clean-up operations are also performed to reclaim the resources used by the just terminated user code.

The Response Handler 40 will preferably store the data retrieved from the external servers 26 in a suitably designed local database 42 for further processing. This part of the processing is application dependent and has no special complications. In case an error is reported in the response from the external server 26, suitable actions can be designed through the use of error handling routines. After the Client Program Manager 28 completes the data retrieval from the various external servers 26, it can summarize and report on the whole data set.

Security Issues

The fact that the system and method of the present invention involves the granting of permission to unknown user programs to execute on a system means that proper security should be in place to prevent potentially hostile code from causing any damage. The security issues essentially deal with: (1) System security and (2) Data security.

By implementing the present invention using Java, the security features inherent in the Java environment can be utilized. For example, Java provides a lot of features to have a strict control on what an application can and cannot do. In particular, the following Java security features are of interest:

1) Class Loader—provides key security features as explained above.
2) Protection Domain—This defines all the permissions that are granted to a code source. Each type (class) in the Java Virtual Machine (JVM) belongs to one and only one Protection Domain. This effectively defines what resources the class can and cannot access.
3) Policy Object—This is a global mapping of code sources to permissions. However, the Class Loader alone places the classes into their Protection Domains. The Class Loader usually queries the Policy Object for the permissions associated with a code source, and associates the permissions object with a Protection Domain, and then assigns the loaded class to the Protection Domain.
4) Class File Verifier—this is very essential for class files fetched over the a network such as the Internet because the byte codes may have been tampered with or may have been produced by a buggy or malicious Java compiler. In the case of the present invention, since the compiler resident on the server itself (i.e., a trusted Java compiler) compiles user code, this feature is of less importance.
5) Security Manager—This is not automatically installed in applications. But once installed, it can check the executing code for access violations automatically. The automatic checking facility is available only for the permissions defined in the Java Security architecture. If user-defined permissions are to be granted to code sources, then the programs have to be designed to check for the required permissions at strategic points in their execution.
6) Privileged API—Because a Java application may use classes belonging to multiple Protection Domains, a thread of execution may traverse multiple domains before it becomes necessary to check the permission needed to access a resource. There are situations in which all the domains traversed should have the required permission, and there are situations in which this should not be the case. The Privileged API helps solve this problem of specifying clearly what is intended.

Figure 6:
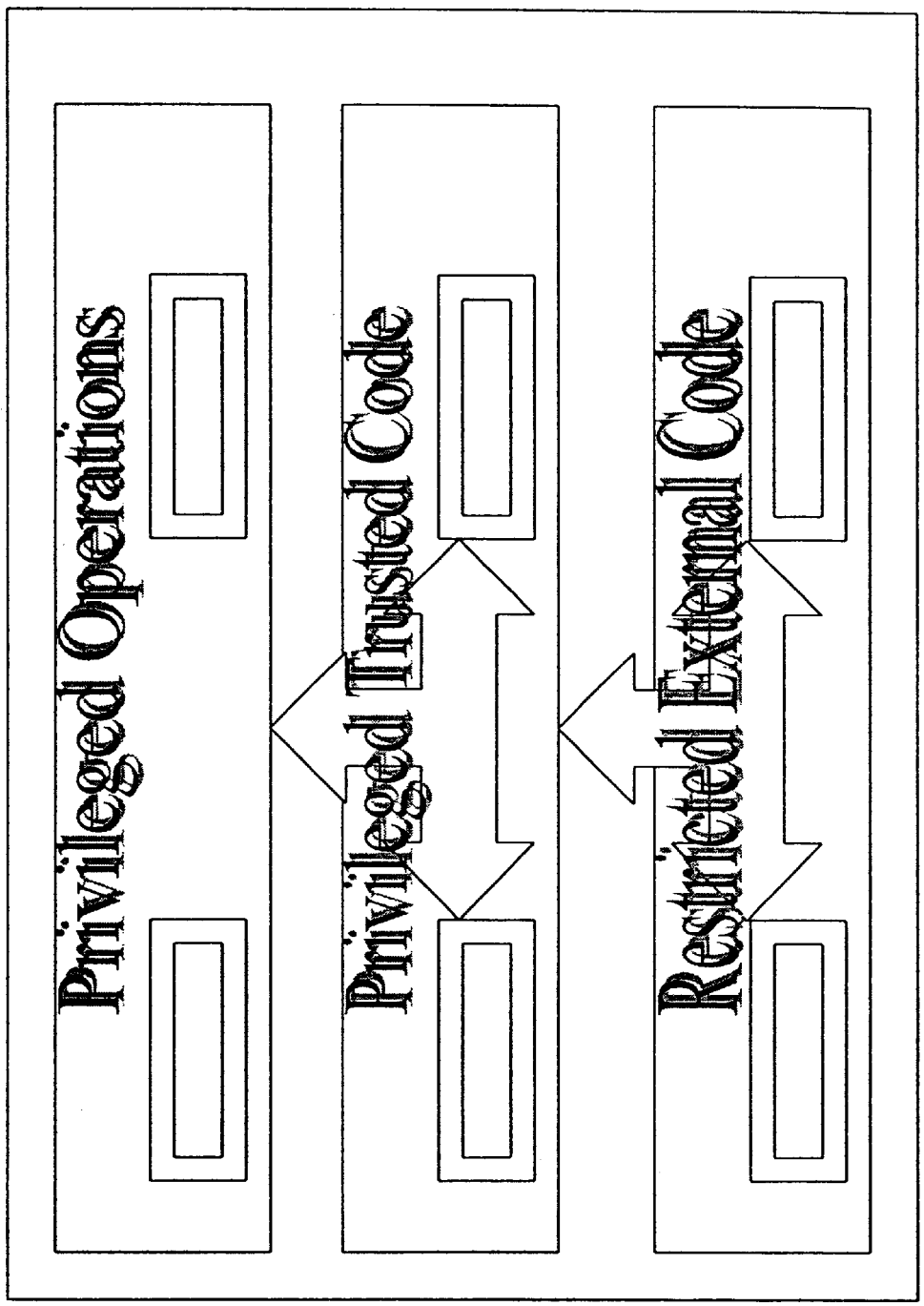
FIG. 6 is a block diagram of the security privileges granted to various pieces of code in a preferred embodiment of the present invention.

The security solution of the present invention divides the user program into two parts—(1) the classes provided with the Semantic Bridge and the Shared Model and (2) the remote code from the user. The classes in the Semantic Bridge and the Shared Model are considered trusted code while the user code is not. As shown in FIG. 6, the trusted code will have the access permissions for reading databases and creating files etc., but the user code will not have any direct I/O permissions. However, the architecture requires that the user code be able to load the trusted code and have the trusted code perform actions that the user code itself does not have the permission to do. This is easily accomplished by forcing the trusted code to execute under privileged mode whenever it has to perform actions that may require special permissions. Since the trusted code is incapable of performing any damaging actions and the untrusted user code will be prevented from performing any direct I/O, the system security is assured. Also, since Java source code is compiled locally, byte code verification is also unnecessary.

The data security features that the DBA uses to control the data that is accessible by the user program have already been described above.

Sample Application Using the Semantic Programming Interface/Semantic Bridge

The system and method of the present invention may be better understood by considering the following example of a data gathering application using the Semantic Programming Interface and the Semantic Bridge.

A law enforcement agency wants to trace the present whereabouts of a man aged about 40 traveling with a boy aged about 14. They are suspected to have left the country using forged documents. What is required is a computer program to identify and verify possible leads on the suspects.

The following programming strategy can be used to accomplish the goal:

1) Identify from the immigration records all travelers (leaving the country) aged about 40 with a boy aged about 14, within the desired period.
2) Verify the travel documents with the issuing authorities, and look for suspicious features, and forgeries.
3) For the leads to be pursued, track the port of disembarkation and the immigration/embarkation records in that country/port to verify if they are still in that country/port. If they have left, trace them to their destination.
4) At their destination, a search on the hotel records is now initiated to finally track down the suspects.

The program may have to gather information from the immigration records, passport issuing records and hotel records from numerous systems with very different data storage schemas. Requests for information may have to be sent to literally thousands of servers. All this can be accomplished easily and effectively using the techniques of the present invention. Furthermore, if the first attempt is not successful, modifications to the algorithms to select the target sites, and modifications to the operations at the selected target sites will significantly alter the results obtained. Because the process is fully automated, this iterative approach can be continued until the desired objective is achieved.

Figure 7:
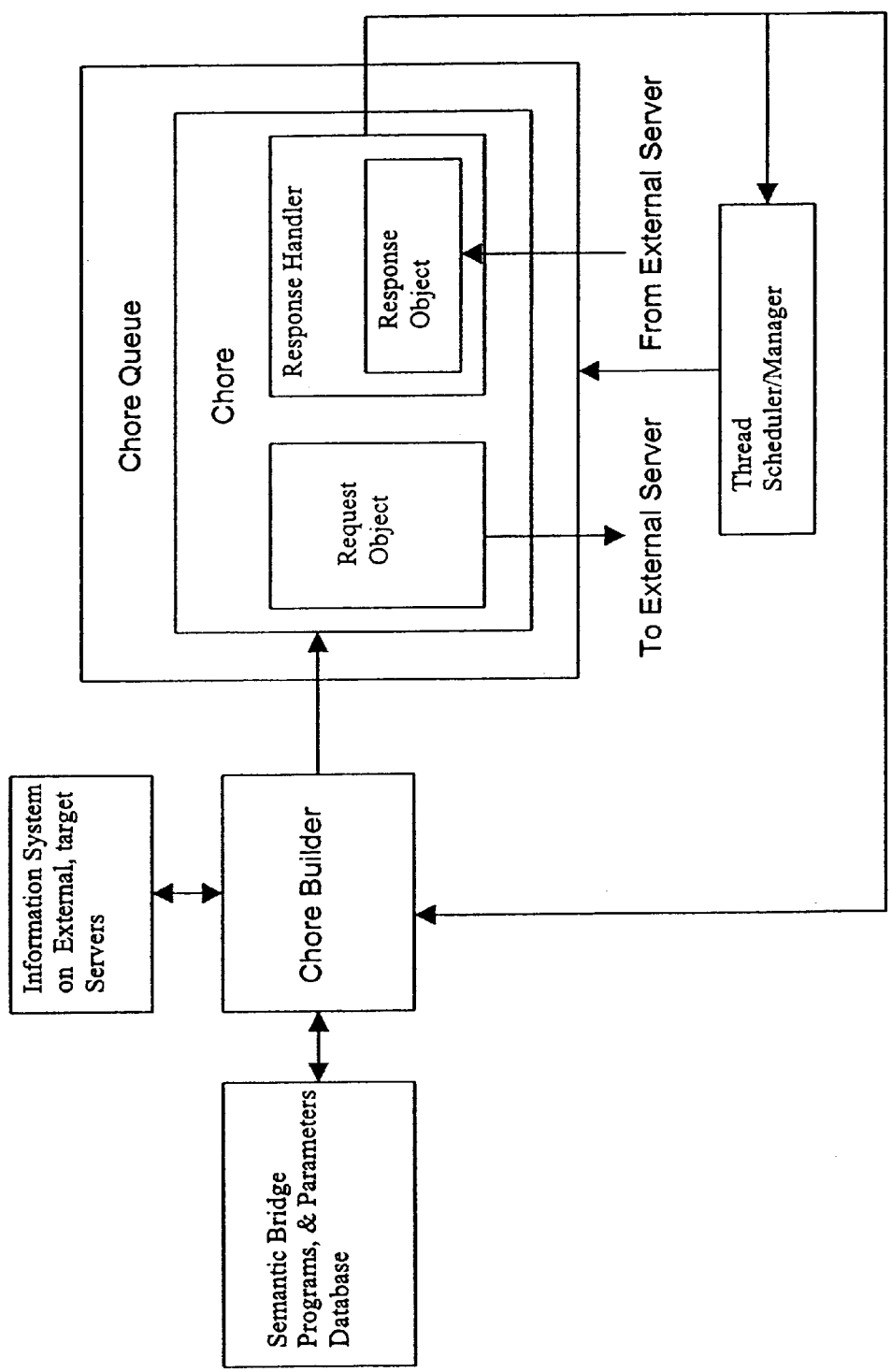
FIG. 7 is a schematic diagram of a preferred embodiment of the present invention.

Turning to FIG. 7, a schematic diagram is shown of the preferred process of creating a program that gathers information from multiple domains. The diagram describes the structure of a complex information gathering application using the features of the Semantic Bridge and the Semantic Programming Interface.

The first step is to identify the target domains and the target servers of interest that implement the Semantic Programming Interface for the domain. This information preferably should be stored in a properly designed database so that it is possible to search for the identity of the target servers based on various criteria such as the domain serviced, other domain specific information, geographical location covered by the data, etc.

The next step is to write programs that we want executed at the various sets of target sites, using the Semantic Programming interface. These programs, called request, will be used to gather the information of interest from the various target servers. Together with these programs, we also need to develop the code, known as response handlers, that will handle the response for each type of request. The combination of the request and response handler is termed a "chore."

The request encapsulates all information specific to a target such as its Internet Protocol (IP) address, the authentication information, protocols needed (such as Secure Sockets Layer (SSL) and SSL session), program to be executed, and the values for program parameters.

The response handler has the ability to handle all possible outputs of the program, including errors. The logic for processing the output received could include sending a different request to some other server belonging to a different domain. In such a case, a program capable of running on this new target domain should also be written and the output of the previous server should be used to select the new list of target servers for each output. This process can repeat recursively depending on the nature of the task at hand. As a result, nested queues are created with chores of different kinds.

The created chores are queued for execution. Preferably, multiple threads, and thus multiple sockets, are created to communicate with the servers. Multiple client machines can also be used to speed up the process of execution of the chores.

In cases where further processing is needed, the response handler has the code to request a new set of chores (having the same request, response handler structure) to be generated by the Chore Builder and queue them for execution on the same thread. Please note that the information in the response may be used to identify a new set of target sites and the program that must run on them. Information contained in the response may also be used as parameters to the program in the next request. This information is sufficient to build a new set of request objects. By associating this set of request objects with another suitable response handler, we have a new set of chores that can be queued for execution.

This way, nested queues of chores can be built dynamically depending on the output received from the target sites. The execution of the chores can be carried out in an orderly and sequential manner. The Thread Scheduler/Manager serves this purpose. Preferably, each thread picks up a chore from the outer-most queue, and processes all chores on all the inner nested queues before picking up any unserviced chore in the outer queue.

Given the above general framework, the steps in the building of the program for the example application can now be discussed.

As a first step, we write the programs using the Semantic Programming Interfaces. These programs include the following:

1) Program to search the Imigration records in all possible ports of embarkation within the country.
2) Program to search for matching disembarkation and embarkation records in other countries.
3) Program to search and verify the validity of the travel documents in the respective systems. This could include verification of the validity of Passports and Visas.
4) Program to search hotel records.

Next, we write the response handlers for each of the programs above. These are associated with their corresponding request-for-information programs. The response handlers have the logic to determine the program and the corresponding response handler to use in the next stage. They also contain the logic to help determine the target sites for the next stage of processing. All response handlers implement a special interface so that the entry point to the code in the response handlers is known.

The Chore Builder does the actual task of identifying the target sites. It does this by querying a local database containing information on accessing Semantic Bridge servlets in various domains. The database is designed to be searchable using the parameter passed to the Chore Builder by the response handler. Sample code to build a chore queue could be:

```
ChoreBuilder builder =
new ChoreBuilder(progrmReference, responseHndlrReference);
    // the two parameters refer to the program and the corresponding
      response handler
    // queue
Q = builder.makeChoreQ(targetSelectionString);
    // the string parameter helps build the SQL query to identify the
      target sites
```

The makeChoreQ routine builds a queue of objects of type chore. The chore objects implement a special interface with an executeChore( ) method. The chore object contains all the information and code necessary to formulate a request to a target Semantic Bridge servlet. The response handler reference should handle all possible responses. The executeChore method first builds the request and sends it to a Semantic Bridge servlet and passes the response to the response handler. The executeChore( ) method is sequentially called on all the chore objects in the queue.

The program can store information on a local database or output the information to the screen or printer. When all the queues are empty, the program terminates.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

APPENDIX A

Sample Java implementation of "Customer" class

```
import java.util.*;
import java.sql.*;

public abstract class AbstractCustomer implements CustomerInterface{
    /*
     *    Declare the properties including the identifier for this object as protected.
     *    The data types and the Units for measurable physical quantities should be
     *    mentioned.
     */
    protected String custID=null;
    protected String name=null;
    protected String addr=null;

/*
 * Two sets of buffers, one to hold the selected identifiers and another to hold object properties
 * retrieved from the database, are declared
 */
    public ResultSet rs1,rs2;

/*
        The following special methods are used to dynamically generate the SQL statements:
            1) getQuery -- this is used to build a query that returns a set of identifiers given a set of
                constraints
            2) select -- this is the main query builder that takes property and relational constraints
    */
    private String getQuery(String constraints)throws Exception{

/*
        Check if the constraints are okay from the security point of view. This involves
        parsing the 'constraints' parameter and identifying each of the Shared Model properties
        referred to in the constraints and checking to see if the user has permission to search on
        that property. The query string that is built has the form:
```

-35-

"Select distinct <objectID> from <viewName> where " + constraints

Note that the query returns the object identifiers only.

The query String that gets built is returned by this method.
```
 */
    }
    public String select(String propertyconstraints,String subquery)throws Exception{
        /*
         * This method is used to select the Identifiers according to the
         * property based conditions and relation based conditions which are
         * given by the user.
         * This method makes use of getQuery() method
         * ExecuteQuery -- Executes the Query and Returns the ResultSet, for example:
                eq = new ExecuteQuery(userQuery);
                rs2 = eq.getResultSet();
         *
         */
            String q1=getQuery(propertyconstraints);
            if(subquery != null){
                    if(propertyconstraints == null)
                            userQuery = q1+" where "+subquery;
                    else
                            userQuery = q1+" and "+subquery;
            }
            else
                    userQuery = q1;
            return userQuery;
        }

/*
     * The following methods are used to form the relations to other objects from this
     object.
     * Each relation is declared as a method
     *    get<X>From<Y>
     *          Where  <X>  --> is the return type of this relationships
     *                 In all cases, it will be the current object.
     *                 <Y>   --> is the object to which the current object is related,
     *
     *          Arguments to these methods are
```

```
*
*                    1)Identifier
*                         It is the identifier <X> participating in <Y>
*                    2)Property constraints
*                         This is the constraint for the properties that are in the <Y>
object.
*                    3)Subquery
*                         This is the relational constraint on the <Y> object
*                         It will be null if <Y> need not be restricted on any relationship.
*
*      All these methods are similar in structure and just a few samples are given
*      The returned strings are of the following form
*      <object ID> in select distinct <corresponding object ID in related object> from <view
*      name of related object> where <property based and relation based constraints on the
*      related object>

*/ public String getCustomerFromCustomerReceipt(String id,String
propertyconstraints,String
            subquery)throws Exception{
        CustomerReceipt c=new CustomerReceipt();
        return (id +" In("+c.getSubQueryCustomerReceipt(id,propertyconstraints,subquery)+")");

} public String getCustomerFromInvoice(String id,String propertyconstraints,String
            subquery)throws Exception{
            Invoice i=new Invoice();
            return (id+" in("+i.getSubQueryInvoice(id,propertyconstraints,subquery)+")");

}

/*  Similar routines are used for relationship with Sales Order, Sales Rejection etc.

/*
    * This method is used to construct the sub Query for this Object
    * id   -- is the Identifier of this object.
    * properyconstraints  -- is the property based conditions for this Object.
    * subquery -- is the relational constraint with another Object, which is related to this
    *           Object.
    * This builds the select statement that returns the identifier, 'id', that is passed as the
    * argument. The select statement uses the view of the customer object for the 'from'
```

-37-

```
             * clause. Any other constraints on the customer object are added to the 'where'
clause.
             */ protected String getSubQueryCustomer(String id,String
   5   propertyconstraints,String
                     subquery)throws Exception{ s = conditionParsing(propertyconstraints); // Check for security clearance
                     if(s!=null)
                         query1="select distinct "+id+" from "+viewName+" where "+s;
  10                 else
                         query1="select distinct "+id+" from "+ viewName;

if(subquery!=null){
                         if(s == null){
                             query1+=" where "+subquery;
  15                     }
                               else{
                             query1+=" and "+subquery;
                         }
                     }
  20             return query1;
                 }
             /*
             Examples of More Complex Denotations More complex relationships are possible when there is a many-to-many
  25         relationship between two objects.

Examples are Vendors and the Products they deal in, Customers and the Products
             they have bought etc. It is now possible to have two separate queries to select the
             sub-sets of the entities participating in the many-to-many relationship. Using
             these a third query is constructed to identify the elements in the first set that are
  30         related to all/none of the elements in the second set.

* Gets all customers from the customer list Query who have bought
             * all products from product list Query
             */ public String getCustomersBoughtAll(String CustomerListQuery,String
  35                 ProductListQuery)throws Exception{

String result=null;
```

-38-

```
                SaleOrder s = new SaleOrder();
                Product p = new Product();
                CustomerListQuery = "select Distinct a.custID from "+this.viewName+"
as a where a.custID in ("+CustomerListQuery+")";
                ProductListQuery = "select Distinct b.prodID from "+p.viewName+" as b
where b.prodID in ("+ProductListQuery+")";
                result = CustomerListQuery+" and not exists("+ProductListQuery+" and
not exists(select * from "+s.viewName+" as c where (a.custID = c.custID) and (b.prodID
= c.prodID)))";

return result;

}

/*
         * Gets all customers from the customer list Query who have bought
         * none of the products from product list Query
         */ public String getCustomersBoughtNone(String CustomerListQuery,String
                ProductListQuery)throws Exception{

String result=null;
                SaleOrder s = new SaleOrder();
                Product p = new Product();
                CustomerListQuery = "select Distinct a.custID from "+this.viewName+"
as a where a.custID in ("+CustomerListQuery+")";
                ProductListQuery = "select Distinct b.prodID from "+p.viewName+" as b
where b.prodID in ("+ProductListQuery+")";
                result = CustomerListQuery+" and not exists("+ProductListQuery+" and
exists(select * from "+s.viewName+" as c where (a.custID = c.custID) and (b.prodID =
c.prodID)))";

return result;
        }
}
```

APPENDIX B

Sample Java code for the compilation and execution of user programs

```
       import sun.tools.javac.*;
       import java.util.*;
  5    import java.lang.reflect.*;

/*
        * Main Utility is a special utility that runs the client programs that comes through the
        * the port from several clients according to their own level of security assigned by the
        DBA.
 10     * Programs should follow certain protocols. For example, they preferably are required to
        * contain a method 'SB_main' like 'main' for 'C' programs so that the Main Utility
        knows
        * that the 'SB_main' method is the entry point to the program.

* This sample is given without the header processing for user authentication,
 15    Programming
        * Domain Identification etc.
        * Special Utility class methods to handle I/O requests from the user code are also not
        * shown.
        */
 20    public class MainUtility{

/*
        * Classname array of string is used to store the array of class names
        * method array is of type Method to store the method available in a class
        * c is of type Class to instantiate a particular class
 25     */
               protected String classname[]=null;
               protected Method method[];
               protected Class c;

/*
 30             * MainUtility constructor gets a string or array of strings as argument which are
                * the class names to be compiled
                */
               public MainUtility(String g[])throws Exception{
                       DBAConnection c1=new DBAConnection();
 35                    classname=g;
               }
```

```
         public MainUtility(String g)throws Exception{
                 DBAConnection c1=new DBAConnection();
                 classname=new String[1];
                 classname[0]=g;
 5       }

/*
          * The compileAll method compiles all the client programs to be processed.  These
          * may be from a directory which is allocated for the user program.  Then,
          * after compilation and running, the client programs should be erased from that
10        * directory. The out put of every user program should be written on a file whose
          * names preferably are unique by getting the names from the system. The compile
          * method is used for compiling the files one by one and the compileAll method will
          * call compile each time.
          */

15       public String compileAll()throws Exception{
                 for(int i=0;i<classname.length;i++){
                         StringTokenizer st=new StringTokenizer(classname[i],".");
                         compile(st.nextToken());
                 }
20               return "\n  Successful Complilation\n ";
         } public String compile(String s)throws Exception{
           Object argslist[],o,o1;
           Method m;
25         Class partypes[]=new Class[8];
                 partypes[0]=Class.forName("java.lang.String");
                 argslist=new Object[1];
    String[] strargs =null;
    argslist[0] = strargs;

30               Main mai=new Main(System.out,null);
                 mai.compile(classname);

c=Class.forName(s);

method=c.getDeclaredMethods();
                 for(int i=0;i<method.length;i++){
35                       Class p[]=method[i].getParameterTypes();
                         if((method[i].getName()).equals("SB_main")){
                                 m=c.getMethod("SB_main",p);
                                 o=c.newInstance();
                                 o1=m.invoke(o,argslist);
```

```
                            return "\n Successfully Compiled and Executed\n";
                    }
            }
            return "\n     There is no SB_main ";
5   } public static void main(String args[]){
            try{
                    String a[]=new String[1];
                    a[0]="SemanticBridge.java";
10                  MainUtility m=new MainUtility(a);
                    System.out.println(m.compileAll());
            }catch(Exception r){
                    System.out.println("\n Error in main "+r);
            }
15          }
    }
```

What is claimed is:

1. A method of processing data stored on one or more computers, the data on each of the one or more computers having a data storage schema, the method comprising:
   (a) receiving an interface-based program on each the one or more computers to process the data, said interface-based program using terms and constructs of a semantic programming interface, the semantic programming interface providing an abstract, object-oriented representation of the data that is independent of the data storage schemas of the data;
   (b) generating a mapping of the representation of the data in the semantic programming interface to each of the data storage schemas, each mapping utilizing rules for generating user-specific views of the data stored on the one or more computers;
   (c) translating the interface-based program into one or more executable programs; and
   (d) running the one or more executable programs on the one or more computers in combination with each data mapping to process the data stored on the one or more computers in accordance with the user-specific views.

2. The method of claim 1 wherein the data stored on the one or more computers is contained in one or more databases.

3. The method of claim 2 wherein each data mapping is a field level mapping that associates the terms and constructs of the semantic programming interface with database fields of each of the one or more databases.

4. The method of claim 1 wherein a user seeks to process the data stored in the one or more computers, the data having access permissions, the method further comprising:
   (e) identifying and authenticating the user to determine the user's access permissions for the data.

5. The method of claim 4 wherein the data stored on the one or more computers is contained in one or more databases and the access permissions of the databases define which fields, rows and tables within the databases the user is entitled to access.

6. The method of claim 4 wherein the data stored on the one or more computers is contained in one or more documents stored on the one or more computers and the access permissions of the documents define which portions of the documents the user is entitled to access.

7. The method of claim 1 wherein the representation of the data in the semantic programming interface includes a specification of properties of the data and relationships among the data.

8. The method of claim 7 wherein data is denoted using the semantic programming interface directly, or indirectly using its relationship with other data, or indirectly using properties of the data.

9. The method of claim 1 wherein the data stored on the one or more computers is contained in one or more documents stored on the one or more computers.

10. The method of claim 1, wherein the user-specific views are generated at runtime by expressions constructed from the mapping to each of the data storage schemas.

11. The method of claim 10 wherein the expressions use SQL syntax.

12. A method of implementing processing on one or more server computers, the data on each of the one or more server computers having a data storage schema, the method comprising:
   (a) generating an interface-based object program at the client computer to process the data, said interface-based object program using terms and constructs of a semantic programming interface, the semantic programming interface providing an abstract, object-oriented representation of the data that is independent of the data storage schemas of the data;
   (b) generating a mapping on each of the server computers of the representation of the data in the semantic programming interface to each of the data storage schemas of the data stored on the one or more server computers, each mapping providing information for generating user-specific views of the data stored on the one or more computers;
   (c) transmitting the interface-based object program from the client computer to the one or more server computers;
   (d) translating the interface-based object program into one or more executable programs at the one or more server computers;
   (e) running the one or more executable programs on the one or more server computers in combination with one or more of the data mappings to process the data at the one or more server computers; and
   (f) returning the processed data to the client computer.

13. The method of claim 11 wherein the data stored on the one or more server computers is contained in one or more databases.

14. The method of claim 13 wherein each data mapping is a field level mapping that associates the terms and constructs of the semantic programming interface with database fields of each of the one or more databases.

15. The method of claim 12 wherein a user seeks to process the data stored in the one or more server computers, the data having access permissions, the method further comprising:
   (g) identifying and authenticating the user to determine the user's access permissions for the data.

16. The method of claim 15 wherein the data stored on the one or more server computers is contained in one or more databases and the access permissions of the databases define which fields, rows and tables within the databases the user is entitled to access.

17. The method of claim 15 wherein the data stored on the one or more server computers is contained in one or more documents stored on the one or more server computers and the access permissions of the documents define which portions of the documents the user is entitled to access.

18. The method of claim 12 the representation of the data in the semantic programming interface includes a specification of properties of the data and relationships among the data.

19. The method of claim 18 wherein data is denoted using the semantic programming interface directly, or indirectly using its relationship with other data, or indirectly using properties of the data.

20. The method of claim 12 wherein the data stored on the one or more server computers is contained in one or more documents stored on the one or more server computers.

21. The method of claim 12, wherein the user-specific views are generated at runtime by expressions constructed from the mapping to each of the data storage schemas.

22. The method of claim 21 wherein the expressions use SQL syntax.

23. A method using denotations for specifying a semantic programming interface, said method for use by a user processing data stored in one or more databases on one or more computers, the method comprising:

(a) identifying computationally meaningful relationships between the data and computationally meaningful groupings of the data;

(b) representing the data as objects, each object having associated methods; and (c) declaring the computationally meaningful relationships and computationally meaningful groupings as the methods associated with the objects;

(d) denoting objects of interest using the relationships and roles the objects of interest play in relation to other ones of the objects; and (e) constructing data selection logic using said denotations without direct access by the user to the one or more databases.

24. The method of claim 23 wherein the methods declared in step (c) return one or more object identifiers.

25. A method for executing on a server computer a source program written on a client computer, the method comprising:

(a) transmitting the source program from the client computer to the server computer along with an identification of a program domain for which the source program is written;

(b) storing the source program on the server computer;

(c) instantiating on the server computer a secure first loader capable of loading classes in the program domain and a secure second loader capable of loading the source program when it has been compiled;

(d) compiling the source program on the server computer;

(e) loading the compiled program using the second loader; and (f) running the compiled program on the server computer.

26. The method of claim 25 wherein the source program is designed to process data stored on the server computer, the data having a data storage schema.

27. The method of claim 26 wherein the source program is written using terms and constructs of a semantic programming interface, the semantic programming interface providing an abstract, object-oriented representation of the data that is independent of the data storage schema of the data.

28. The method of claim 26 wherein running the compiled program on the server computer generates output from the processed data, the method further comprising:

(g) transmitting the output from the server computer to the client computer.

29. The method of claim 25 wherein a user generates the source program written on the client computer, the method further comprising:

(h) identifying and authenticating the user on the server computer to determine the user's access permissions on the server computer.

30. A method of creating and executing one or more programs on a client computer for processing data from one or more domains, the data being stored on one or more server computers, the method comprising:

(a) identifying the one or more domains and the one or more server computers;

(b) generating request code and response handler code, said request code to process the data stored on the one or more server computers and said response handler code to handle an output received from the one or more server computers in response to receiving a request generated by the request code, wherein said request code and said response handler code use terms and constructs of a semantic programming interface, the semantic programming interface providing an abstract, object-oriented representation of the data that is independent of the data storage schema of the data, and wherein the response handler code includes the capability of identifying a new set of servers and the capability of handling information that may be used as parameters in a succeeding request, depending on the nature of the further processing required in the original request;

(c) combining the request code and the response handler code to form one or more chores including nested chores of different kinds; and (d) queuing the chores for execution.

31. The method of claim 30 wherein in step (d) the chores are serviced using multiple threads.

32. The method of claim 30 wherein the one or more identified servers in step (a) are divided among one or more client machines to carry out steps (b) through (d) in parallel.

33. The method of claim 30 wherein each request encapsulates information specific to one of the server computers including the IP address of the server computer, authentication information, protocols needed, the code to be executed and values for code parameters.

* * * * *